United States Patent
James et al.

(10) Patent No.: US 11,757,898 B2
(45) Date of Patent: *Sep. 12, 2023

(54) LOCATION-BASED PARENTAL CONTROLS

(71) Applicant: Comcast Cable Communications, LLC, Philadelphia, PA (US)

(72) Inventors: Brian James, Brooklyn, NY (US); Bridget Brennan, Brooklyn, NY (US); Steven Leardi, New York, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,293

(22) Filed: Mar. 11, 2022

(65) Prior Publication Data
US 2022/0201006 A1   Jun. 23, 2022

Related U.S. Application Data

(63) Continuation of application No. 16/676,596, filed on Nov. 7, 2019, now Pat. No. 11,303,648.

(51) Int. Cl.
*G06F 15/16* (2006.01)
*H04L 9/40* (2022.01)
*H04W 4/029* (2018.01)

(52) U.S. Cl.
CPC .......... *H04L 63/107* (2013.01); *H04L 63/102* (2013.01); *H04W 4/029* (2018.02)

(58) Field of Classification Search
CPC ..... H04L 63/107; H04L 63/102; H04W 4/029
USPC ........................................................ 709/203
See application file for complete search history.

(56) References Cited

U.S. PATENT DOCUMENTS

| | | | |
|---|---|---|---|
| 7,945,167 B2 * | 5/2011 | Narkmon | H04W 48/04 |
| | | | 398/115 |
| 8,165,561 B2 | 4/2012 | Cai et al. | |
| 8,694,024 B2 | 4/2014 | Ng et al. | |
| 8,797,898 B2 | 8/2014 | Kim et al. | |
| 8,804,527 B2 | 8/2014 | Pollari et al. | |
| 8,913,959 B1 | 12/2014 | Pochop, Jr. et al. | |
| 9,084,089 B2 | 7/2015 | Ng et al. | |
| 9,118,656 B2 * | 8/2015 | Ting | H04L 63/0815 |
| 9,247,394 B2 | 1/2016 | V.M. et al. | |
| 9,424,603 B2 | 8/2016 | Hammad et al. | |
| 9,491,583 B2 * | 11/2016 | Venkatraman | G01S 5/02521 |
| 9,819,610 B1 * | 11/2017 | Crump | G06V 40/172 |
| 9,992,621 B2 | 6/2018 | Beattie, Jr. et al. | |
| 10,524,195 B2 * | 12/2019 | Wang | H04W 48/16 |
| 10,820,294 B2 * | 10/2020 | Wang | H04B 17/318 |
| 11,303,648 B2 * | 4/2022 | James | H04N 21/4524 |

(Continued)

*Primary Examiner* — Moustafa M Meky
(74) *Attorney, Agent, or Firm* — Banner & Witcoff, Ltd.

(57) ABSTRACT

Systems, apparatuses, and methods are described for parental controls based on the location of a wireless computing device. Wireless access points may be located in different locations, e.g., in different rooms of a home. The location of the wireless computing device may be determined based on comparing measured signal strengths to baseline signal strengths associated with the location. Information related to an access level associated with the location may be determined. The access level may, for example, permit access to content in a first location, but prevent access to the content in a second location. Content may be provided to the wireless computing device based on the access level associated with the location.

33 Claims, 9 Drawing Sheets

(56) References Cited

U.S. PATENT DOCUMENTS

| | | | |
|---|---|---|---|
| 2007/0186106 A1* | 8/2007 | Ting | H04L 63/0815 |
| | | | 713/168 |
| 2008/0268766 A1* | 10/2008 | Narkmon | H04W 48/02 |
| | | | 455/1 |
| 2012/0163215 A1 | 6/2012 | Kim et al. | |
| 2014/0189806 A1* | 7/2014 | Cho | H04L 63/107 |
| | | | 726/4 |
| 2014/0315585 A1 | 10/2014 | Pollari et al. | |
| 2015/0281908 A1* | 10/2015 | Venkatraman | G01S 5/02521 |
| | | | 455/456.6 |
| 2016/0050538 A1 | 2/2016 | Belz et al. | |
| 2017/0086022 A1 | 3/2017 | Beattie, Jr. et al. | |
| 2019/0191407 A1* | 6/2019 | Wang | H04W 8/02 |

* cited by examiner

LOCATION-BASED PARENTAL CONTROLS

CROSS-REFERENCES

This application is a continuation of U.S. patent application Ser. No. 16/676,596, filed Nov. 7, 2019. The above-referenced application is hereby incorporated by reference in its entirety.

BACKGROUND

User devices (e.g., smartphones, video streaming devices, personal computers, etc.) may be able to access a variety of content. This may increase the burden on a content provider in many ways. One such burden relates to parental controls for authorizing access to content by user devices within a physical location (e.g., the premises of a home). Parental controls may often be configured based on an identity of a user or a device, but do not account for, e.g., the location of a user device.

SUMMARY

The following summary presents a simplified summary of certain features. The summary is not an extensive overview and is not intended to identify key or critical elements.

Methods, systems, and apparatuses are described for controlling access to content by wireless computing devices based on the location of those wireless computing devices. A premises, such as a home or office, may have one or more wireless access points, via which one or more wireless computing devices may access content (e.g., web pages, media content, or the like). Based on which of the wireless access points a wireless computing device is connected to, a location of the wireless computing device may be determined. For example, if every room in a home has a wireless access point, and if a wireless computing device is connected to a wireless access point in a living room, the wireless computing device may be determined to be in the living room. As another example, if the wireless computing device is connected to one or more different wireless access points, the signal strengths corresponding to communications between the wireless computing device and the one or more different wireless access points may be compared (e.g., to a threshold based on historic signal strengths) to determine a location of the wireless computing device. The location may be associated with an access level, which may govern access to content in that location. For example, a wireless computing device associated with a child and located in a room might be restricted in its access to certain content, whereas a different wireless computing device associated with a parent and located in the same room might be provided unrestricted access to the content.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
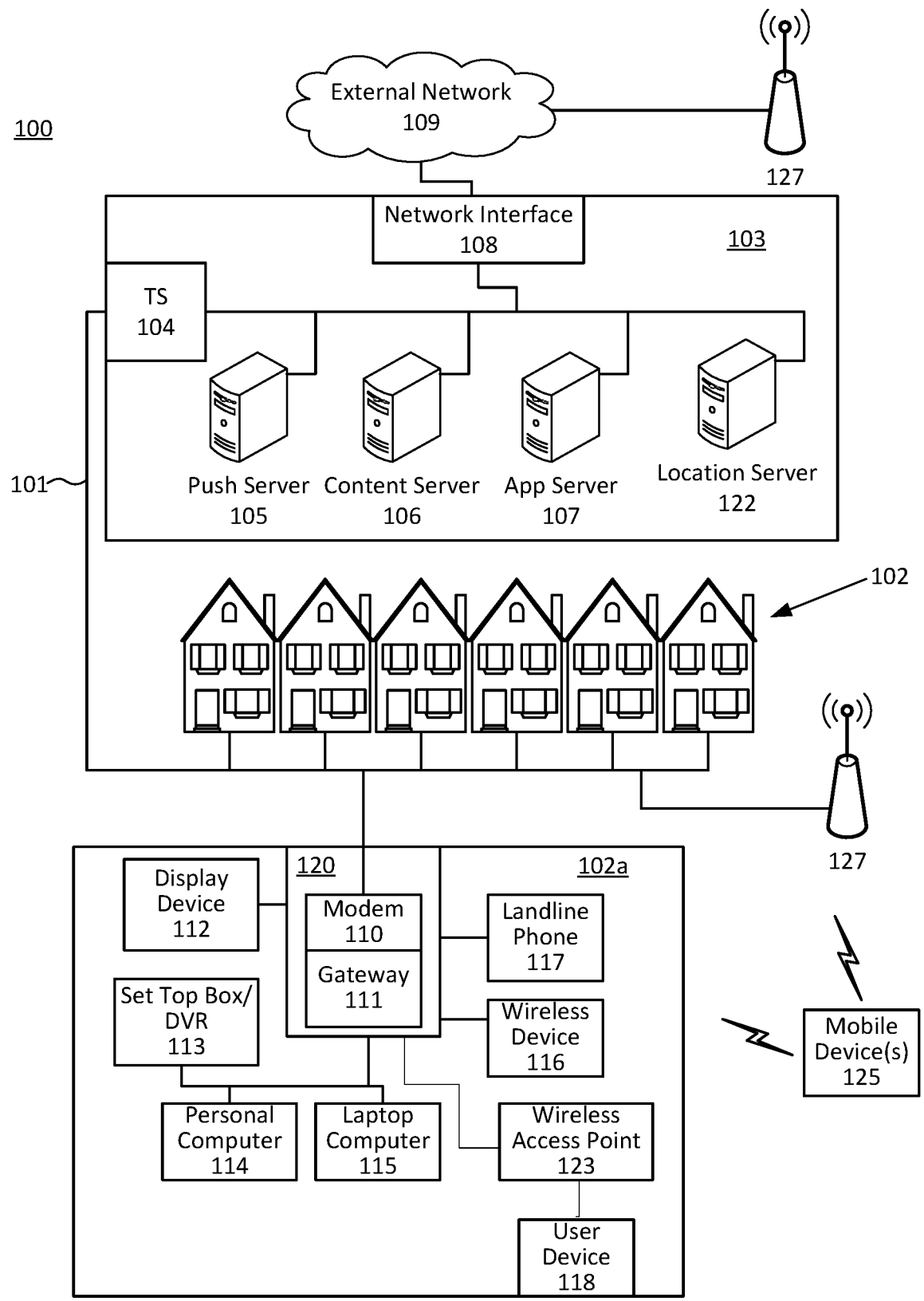
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the location server 122 (described below), additional push, content, and/or application servers, and/or other types of servers.

The location server 122 may contain registries or databases of identifiers and associated data (e.g., location information, device information, user information and/or other information) for each identifier. The location server 122 may provide a user interface to enable a user to setup the user's registry of identifiers and user inputted information for each identifier. Although shown separately, the push server 105, the content server 106, the application server 107, the location server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. The premises 102a may also comprise wireless access points 123 which may be located between the Gateway 111 and the user devices 118. The wireless access points may be used to extend the wireless (e.g., WiFi) network connection to different locations in the premises 102a. The wireless access points 123 may be wireless devices that may be placed in different locations in the premises 102a to extend the reach and connectivity of the WiFi network provided by the modem 110 and/or gateway 111.

Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
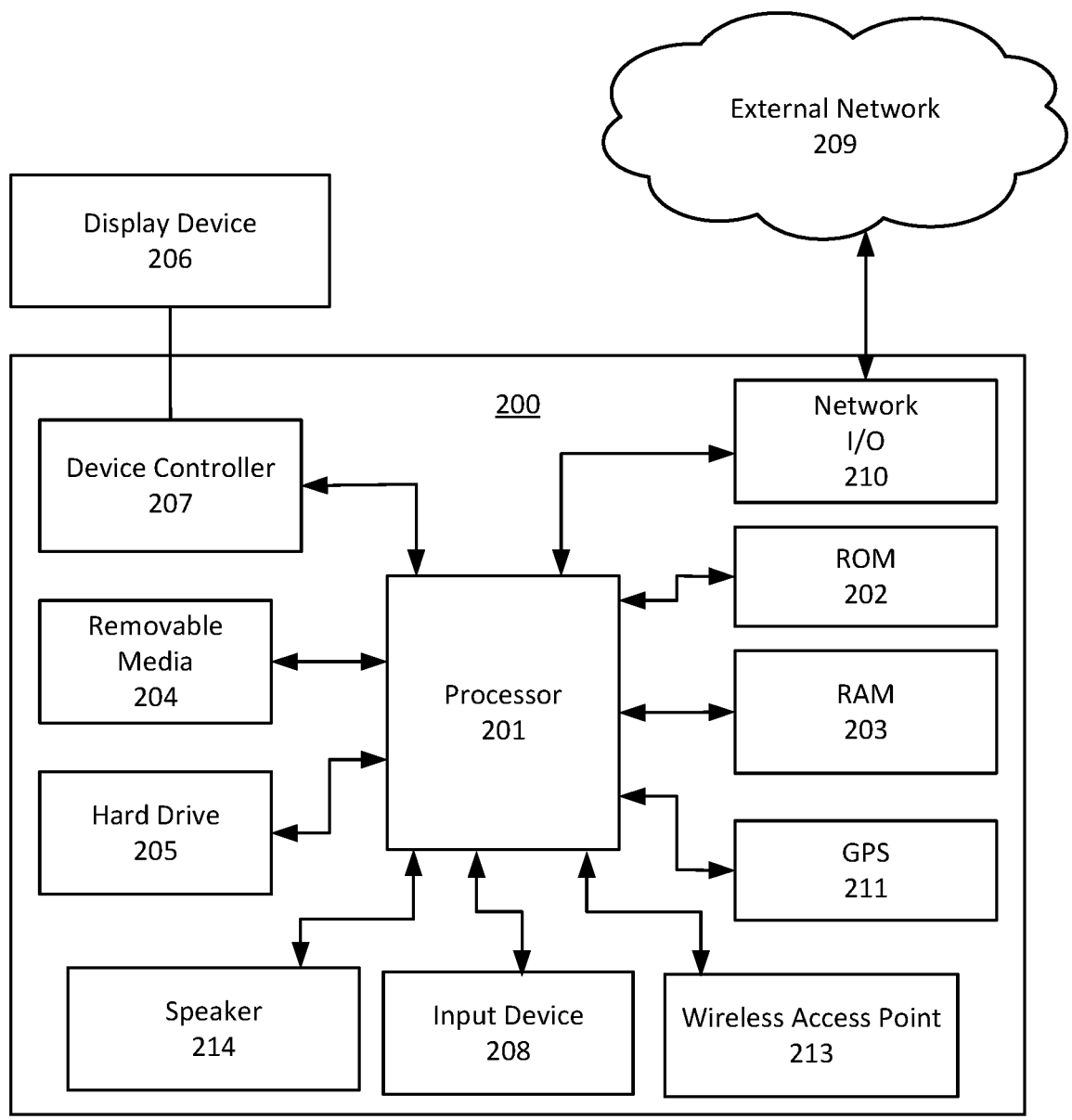
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200. Additionally, the computing device 200 may comprise wireless access points 213 capable of receiving and sending WiFi network communication signals to user devices 118 in the wireless home network.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

A device (e.g., a wireless computing device) may receive content that is restricted and/or filtered based on the location of the device in a premises. Location-based parental controls may allow for minimal setup of devices. For example, filtering and/or access (e.g., to content) may be based on the location of a device in a building.

Figure 3:
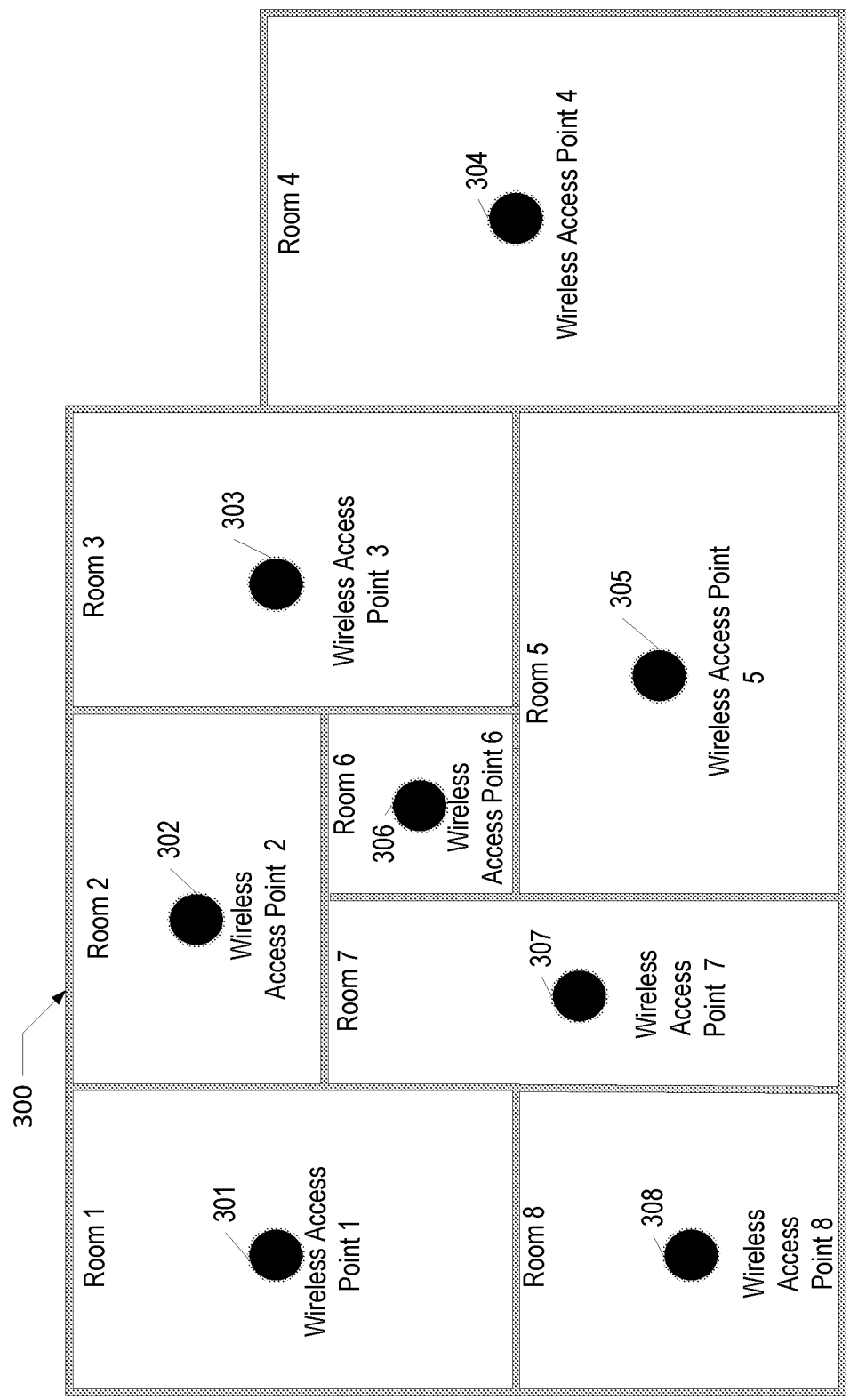
FIG. 3 shows an example building including wireless access points.

FIG. 3 shows a premises 300 (e.g., a physical location, such as a house, office, or the like) comprising wireless access points 301-308. The premises 300 may comprise the devices shown and described for the premises 102*a*. There may be one or more wireless access points in rooms of the premises 300. Each room of the premises 300 may have its own wireless access point. For example, the wireless access point 301 is located in a dining room, and the wireless access point 304 is located in a master bedroom. Additionally or alternatively, there may be only a single wireless access point in the premises 300. Wireless access points may, but need not be, located in and/or associated with every room of the premises 300.

Though FIG. 3 and other examples herein discuss wireless access points with respect to a home with rooms, features described herein need not be limited to a building with rooms. For example, features described herein may be used in connection with networks comprising multiple access points located outdoors (e.g., a large stadium with numerous wireless access points), with networks comprising multiple access points located in a single room (e.g., a large auditorium, a large workspace dived by partitions, etc.), and/or with networks comprising multiple access points in other types of locations.

Wireless access points, such as the wireless access points 301-308, may be computing devices that may provide wireless (e.g., WiFi) connectivity (e.g., in the premises 300). Wireless access points, such as the wireless access points 301-308, may additionally and/or alternatively extend wireless connectivity. For example, wireless access points may be placed throughout one or more locations (e.g., in the premises 300) to extend wireless connectivity from a single wireless gateway and into geographic regions which, without the presence of such wireless access points, may have a weak (or no) wireless signal. For example, wireless access points may be placed in every room in a house, and/or in rooms where there may be no parental supervision (e.g., a child's room, the game room, and the bathroom). Additionally and/or alternatively, wireless access points may be placed on each floor of a house. The placement of wireless access points may be associated with control and/or filtering of access to content. For example, a wireless access point located in a basement (where, for example, a game room often used by children) may have stricter content filters as compared to a wireless access point located in a master bedroom (where parents of the children may sleep). Wireless access points may be manually placed in different locations, and may be moved between locations.

Wireless access points (e.g., the wireless access points 301-308) may be paired with a router and/or gateway (e.g., the gateway 111) to create a mesh wireless network, which may extend wireless coverage to various geographic areas (e.g., of the premises 300). Wireless access points may, e.g., in conjunction with such routers and/or gateways, continuously monitor and/or optimize wireless connections. Wireless access points may be managed by a cloud-based, remote management platform. Wireless access points may facilitate user devices using bands and/or channels.

Information associated with a wireless access point may be stored, e.g., in a database. Identifiers may be selected and stored for each wireless access point in a premises. For example, a wireless access point may be registered, and a new entry corresponding to the wireless access point may be added to a database of wireless access points maintained by a server. Based on determining an identifier for a wireless access point in a location, the server may, using the identifier, query for information (e.g., information stored in a database) associated with the identifier. A particular wireless access point may be additionally and/or alternatively associated with a geographical location (e.g., a physical location, such as an office in a corporate office building, a room location in a house, a particular portion of an outdoor venue, and/or another similar portion of the premises 300). For example, for wireless access point 308 (which corresponds to identifier "wireless access point 8" or "8" and is shown as being located in the living room of the premises 300 in FIG. 3), a user (e.g., an administrator) may assign the identifier "8" to the living room of the premises 300. Similarly, the user may assign the identifier "5" to room 5 (e.g., the game room) of the premises 300. A device connected to the wireless access point 308 may retrieve the identifier "8" and may, based on that identifier, determine that it is at or near the living room of the premises 300. Similar association information between geographic locations and identifiers of wireless access points in these geographic locations (e.g., the wireless access points 301-308) may be stored. The information stored for the wireless access points may additionally and/or alternatively include other identifiers of wireless access points (e.g., serial numbers, MAC addresses, and/or IP addresses).

The information associated with wireless access points (e.g., the wireless access points 301-308) may additionally and/or alternatively comprise access levels. Access levels may limit access to wireless access points and/or content provided by those wireless access points (e.g., services provided by those wireless access point, such as access to the Internet). Access levels may limit receipt and/or transmission of content based on a location of a wireless computing device. For example, an access level associated with a child's room may prevent violent content from being transmitted to a wireless computing device in the child's room. Access levels may correspond to different levels of access to content for one or more geographic locations. For example, access levels corresponding to a child's bedroom may be stricter than access levels corresponding to a master bedroom. Access levels may provide users with the ability to filter and control access to content provided to wireless computing devices based on their geographic location and connectivity to a particular wireless access point in the house. For example, common areas (e.g., of an office or home) may be associated with a more permissive level of access to content than private areas, as supervision (e.g., by parents, co-workers, or the like) in those common areas may be easier. As another example, a parent might configure access levels in different rooms of a house to prevent devices associated with children from accessing certain content in certain rooms, but wireless computing devices associated with the parents may access any content freely from any room. Access levels may be determined using manual user input. For example, a parent may establish one or more access levels using a computing device. Access levels may also be generated. A computing device may generate one or more access levels based on historical data relating to, e.g., one or more devices accessing content in one or more locations. For example, if a user device rarely accesses content in a room in a home, then the access levels for that room may be relatively more restrictive than access levels for other rooms in the home. Access levels may be automatically generated based on the predicted occupants of a location such that, for example, access levels may be generated to be relatively more restrictive based on a determination that a particular location is associated with children.

Figure 4:
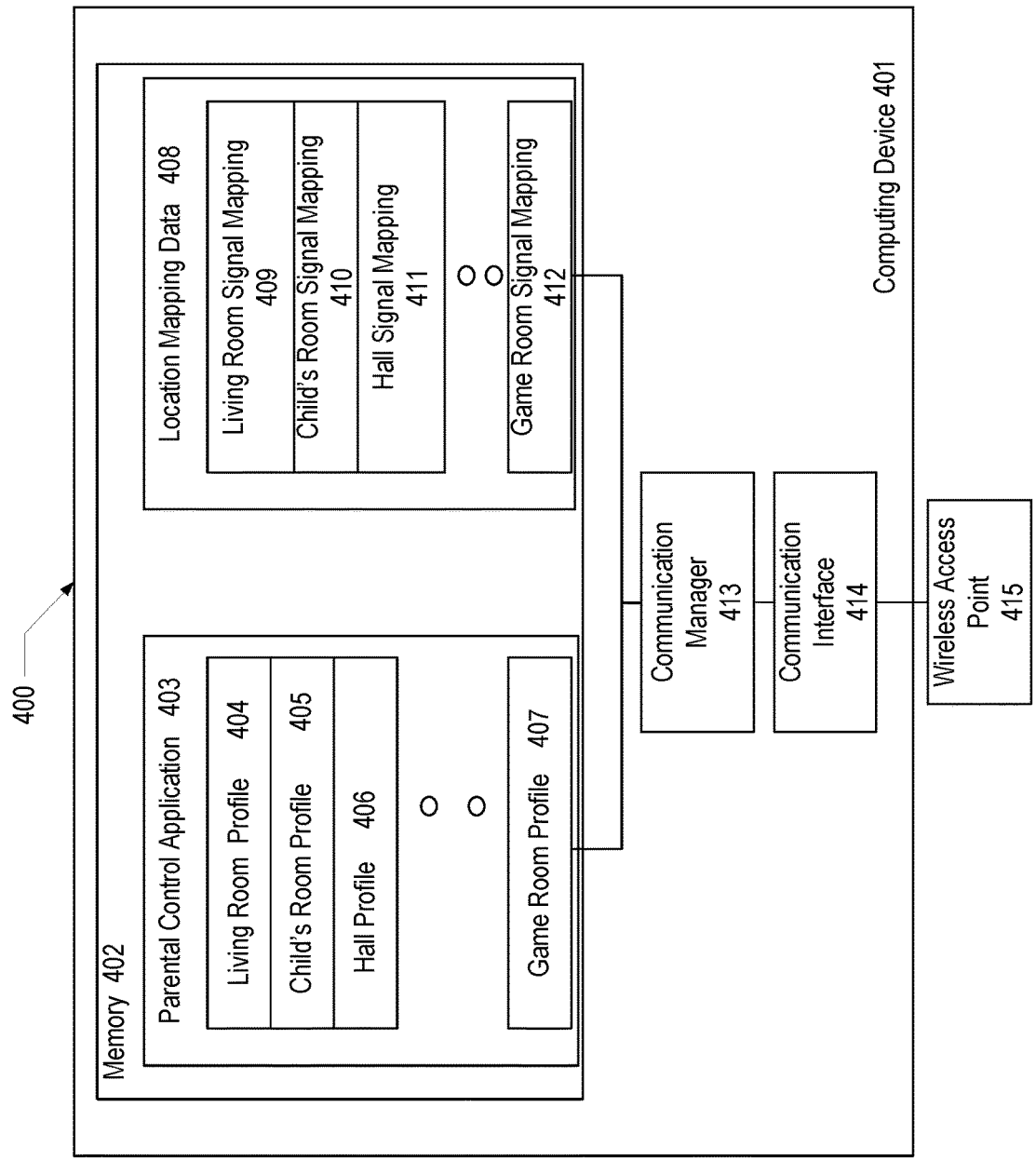
FIG. 4 shows an example wireless access point server computing system that includes a parental control application.

FIG. 4 shows a server 400 that may be a computing device 401. Though shown as the computing device 401, the server 400 may be executed on one or more computing devices (e.g., a combination of computing devices). The server 400 may comprise memory 402, a parental control application 403, location mapping data 408, a communication manager 413, and a communication interface 414. A wireless access point 415 may communicate with the server 400 via, e.g., the communication interface 414. The wireless access point 415 may be one or more of the wireless access points 301-308. The server 400 may send, via wireless access point 415, and based on a particular profile associated with a request from wireless access point 415, content to the wireless computing device in communication with wireless access point 415. The memory 402 may comprise a database for storing the parental control application 403 and location mapping data 408.

The parental control application 403 may be configured to determine access restrictions relating to one or more geographic locations. The parental control application 403 may comprise one or more profiles, and each profile in the one or more profiles may comprise information regarding the access level for a wireless computing device associated with a particular access point and/or location. For example, the parental control application 403 may comprise profiles such as a living room profile 404, a child's room profile 405, and a game room profile 407. Though the living room, child's room, and game room are referred to in FIG. 4, any rooms and/or locations in a premises may have a corresponding profile. Each such profile may be associated with a different access level. A wireless computing device in a first room may, based on a first access level, be permitted to access all content, whereas the same wireless computing device may, based on a second access level, be permitted to access only a subset of the content in a second room. For example, with respect to the premises 300, the child's room profile 405 may contain information that prevents a wireless computing device, located in the child's room of the premises 300 and connected to the wireless access point 302 in the child's room, from viewing programs that may be inappropriate for children. For example, the living room profile 404 may contain information that allows wireless computing devices, connected to the wireless access point 308, located in the living room of the premises 300, unrestricted access to all of the subscribed programs in the house. Access restrictions may not apply to certain geographic locations. For example, a guest room may have unrestricted Internet access.

A profile may comprise information indicating access levels that may vary based on time. A wireless computing device may be permitted to access a greater amount of content during a first time period, but a relatively lesser amount of content during a second time period. For example, Internet access may be limited and/or prohibited during bedtime hours. For example, wireless devices associated with teenagers may be permitted a greater amount of access to content during the summer and/or during the weekend, but he same wireless devices may be provided a significantly more restricted amount of access to content before a finals week.

Profiles may additionally and/or alternatively be configured to provide different wireless computing devices in the same or similar geographic locations with different levels of access to content. Additionally and/or alternatively, profiles may provide wireless computing devices connected to the same wireless access point (e.g., the wireless access point 308) with different levels of access to content because the wireless computing devices are located in different geographic areas. For example, the game room profile 407 may restrict a first wireless computing device, in the game room of the premises 300 and connected to the wireless access point 305, from viewing content, and the game room profile 407 may permit a second wireless computing device, in the office of the premises 300 and connected to the wireless access point 305, to view the content. Profiles may be dynamic and may be changed to meet the needs of one or more users. For example, the profiles may be configured to change based on the time of day, the number and/or type of wireless computing devices connected, and/or some combination of different parameters. For example, the game room profile 407 may permit a third wireless computing device, in the game room of the premises 300 and connected to the wireless access point 305, to view content because, unlike the first wireless computing devices mentioned above, the third wireless computing device may have special permissions (e.g., the wireless computing device may be an adult's cell phone). Profiles may be configured based on the presence or absence of a particular wireless computing device in a particular location. For example, the presence of a wireless computing device associated with a parent in a room may permit other wireless computing devices (e.g., childrens' tablets) in the same room to access a broader range of content. Wireless computing devices (e.g., childrens' devices and adult devices) may be added to profiles, and such devices may be provided different levels of access to content based on those profiles. For example, a profile for a guest may specify that the guest has unrestricted access to content, whereas a profile for a child may limit access to violent content. Profiles may provide different devices different levels of access to content based on time. For example, a profile associated with children may restrict access to most Internet content after a time (e.g., 9:00 PM) associated with a bedtime.

The location mapping data 408 may be configured to enable the server 400 to determine a location of a wireless computing device. The location of a wireless computing device may be determined by comparing baseline wireless measurements for a geographic location with measurements received from the wireless computing device. The location mapping data 408 may comprise a predetermined signal strength mapping corresponding to one or more geographic locations. For example, for the premises 300, the location mapping data 408 may comprise a living room signal mapping 409, a child's room signal mapping 410, and/or a game room signal mapping 412. These signal mappings may additionally and/or alternatively comprise baseline signal strengths associated with one or more wireless access points (e.g., the wireless access point 415). Such baseline signal strengths may be compared to signal strengths measured by a wireless computing device. Wireless computing devices may be configured to measure strength of received wireless signals and/or to provide values for such measurements based on a request. Thus, for example, the location of a wireless computing device may be determined by comparing baseline data associated with a predetermined signal mapping of wireless signal strength measurements for a particular location to wireless computing device measured data associated with signal strength measurements. Determining the location of a wireless computing device is further described in connection with FIG. 6A, FIG. 6B, and FIG. 8.

Using the parental control application 403, an access level from a profile (e.g., the living room profile 404 or the child's room profile 405) may be determined based on the location of a wireless computing device. This access level may be transmitted to a wireless access point (e.g., the wireless access point 415).

The communication manager 413 may determine a geographic location of the wireless computing device. For example, such a determination may be made in response to a wireless computing device establishing a wireless connection with a wireless access point (e.g., one or more of the wireless access points 301-308). The communication manager 413 may determine the location of the wireless computing device based on received wireless signal strengths and the location mapping data 408. Once the communication manager 413 determines the location of the wireless computing device (e.g., a room where the wireless computing device is located), the communication manager 413 may retrieve information associated with the location (e.g., a room profile associated with the location) from the parental control application 403. Based on the information regarding the location (e.g., the profile, including one or more access levels indicated by the profile), content may be provided to the wireless computing device via the wireless access point with which the wireless computing device established a connection. For example, based on the location of a wireless computing device, merely a subset of all available content may be accessible by the wireless computing device. The wireless access point may receive requests for content from the wireless computing device, and a computing device (e.g., the wireless access point) may deliver content to the wireless computing device based on the user profile.

Figure 5:
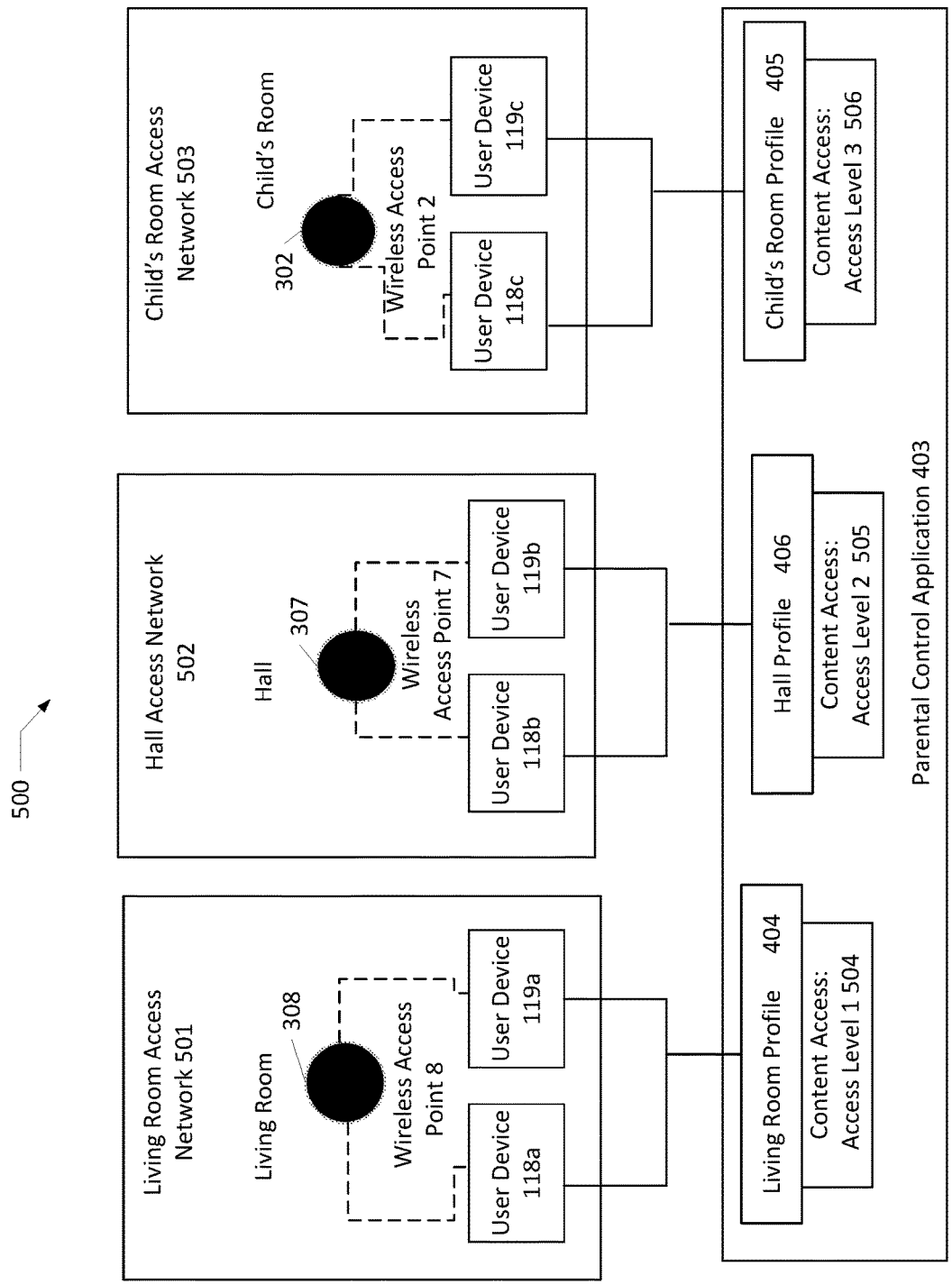
FIG. 5 shows an example wireless access network showing communication between user devices and wireless access points.

FIG. 5 shows an example wireless access network showing communication between wireless computing devices and wireless access points. The wireless access network 500 comprises room access networks corresponding to different wireless access points. Wireless access point 308, identified as "wireless access point 8," may be in a living room and part of a living room access network 501. Wireless access points 307 and 302, identified as "wireless access point 7" and "wireless access point 2," respectively, may be located in a hall and a child's room, and may be parts of a hall access network 502 and a child's room access network 503, respectively.

Access networks, such as the living room access network 501, the hall access network 502, and the child's room access network 503, may be associated with an access level. Such access levels may be defined by, e.g., the parental control application 403. For example, the living room access network 501 may be associated with a first access level 504, which may be defined in the living room profile 404 of the parental control application 403. The hall access network 502 may be associated with a second access level 505, which may be defined in the hall profile 406 of the parental control application 403. The child's room access network 503 may be associated with a third access level 506, which may be defined in the child's room profile 405 of the parental control application 403.

Access levels (such as the first access level 504, the second access level 505, and/or the third access level 506) may be configured to filter content using one or more filters. Filtering content may comprise providing a first portion of content while preventing access to a second portion of content. For example, a filter may permit access to portions of an online encyclopedia relating to history, but not to portions of the online encyclopedia of a prurient nature. Such filtering may be configured and/or performed as part of the access levels. For example, an access level may comprise a plurality of filters, each corresponding to different content for filtering. An access level (e.g., the third access level 506) may be configured to restrict access to certain content (e.g., certain websites) for wireless computing devices connected to a network (e.g., the child's room access network 503). An access level (e.g., the first access level 504) may be configured to provide unrestricted access to all programs for wireless computing devices connected to a network (e.g., the living room access network 501). Access levels may be configured such that a first wireless computing device, located in a particular location, may access the first access level 504, and that a second wireless computing device, located in the same location as the first computing device, may access content associated with a different access level. Access levels may be configured such that the level of access to content of a first wireless computing device may vary based on the presence or absence of a second wireless computing device.

Multiple wireless computing devices connected to the same wireless access network(s) and located in similar locations may be associated with the same or a different access level. The same access level may provide different levels of access to different wireless computing devices. For example, a wireless computing device associated with a parent may have unrestricted access to content regardless of location of access level, whereas a different wireless computing device associated with a child may access content based on different access levels, and those different access levels may be based on the location of the different wireless computing device. Wireless computing devices 118a and 119a are shown in FIG. 5 as connected to the living room access network 501, and may be allowed access to content based on the first access level 504. If, for example, the wireless computing device 118a is associated with a parent, that device may have unrestricted access to content via the living room network 501 regardless of the first access level 504. If, as another example, the wireless computing device 119a is associated with a child, that device may have restricted access to content via the living room network 501 based on the first access level 504. Wireless computing devices 118b and 119b are shown in FIG. 5 as connected to the hall access network 502, and may be permitted access to content based on the second access level 505. Wireless computing devices 118c and 119c are shown in FIG. 5 as connected to the child's room access network 503, and may be allowed access to content based on the third access level 506.

Access (e.g., to one or more services or content) by wireless computing devices may be monitored (e.g., by one or more of the wireless access points) and/or reported (e.g., by a storage device). For example, the wireless access points may be configured to periodically transmit, e.g., to a central computing device, access records corresponding to access, by one or more wireless computing devices and in one or more locations, to content. Access may be monitored and/or reported based on a location of a wireless computing device. For example, web browsing activity by a child in the child's room 302 may be monitored and stored in memory 402. For example, web browsing activity by a child in the living room 308 need not be monitored or reported. The parental control application 403 may be configured to allow access to different content types based on time (e.g., a date and/or time of the day). For example, a wireless computing device may be allowed to access video streaming traffic up until midnight, and then the wireless computing device may be allowed to stream only audio content after midnight.

Figure 6A:
FIGS. 6A-6B are tables comparing example baseline wireless signal strength measurements with signal strength measurements by a user device.

FIG. 6A is a table that shows example signal strengths for a wireless computing device in the first room of the premises 300. Such a table may be stored in memory, e.g., the memory 402. A first column 601 comprises entries corresponding to different wireless access points of the wireless access points 301-308. A second column 602, indicating the first room signal mapping, comprises entries indicating baseline data associated with a predetermined mapping of measured wireless signal strengths associated with the wireless access points 301-308 in the premises 300. These baseline wireless signal strengths may correspond to expected signal strengths associated with communications with wireless access points (e.g., wireless access points outside of the first room) as measured by a wireless computing device in the first room. The measurements shown in the second column 602 may correspond to expected values of signal strengths based on a predetermined mapping of measured signal strengths, from the wireless access point 305 in the first room and from other wireless access points 301-304, 306-308 outside the first room, as measured by a test wireless computing device in the first room. For example, the first row of the second column 602 includes a value of −50 decibel milliwatts (dBm) that indicates an expected signal strength of a signal from the wireless access point 301 in the dining room. Such expected signal strengths may be determined by measuring, using a test wireless computing device, signal strengths in various positons in a location. Additionally and/or alternatively, such expected signal strengths may be determined based on a history of signal strengths (e.g., as reported by one or more wireless computing devices in the location), based on a model of one or more locations (e.g., expected signal strengths in a location based on the number of walls between the wireless access point and a hypothetical wireless device), and the like. Similarly, the second through eighth rows of the second column 602 respectively include values of −43 dBm, −34 dBm, −46 dBm, −20 dBm, −35 dBm, −46 dBm, and −40 dBm that respectively indicate expected signal strengths, as measured by a test wireless computing device in the first room, of signals from the wireless access points 302 (in the child's room), 303 (in the office), 304 (in the master bedroom), 305 (in the first room), 306 (in the bathroom), 307 (in the hall), and 308 (in the second room). The baseline data shown in column 602 may be received (e.g., by the server 400 and/or via the wireless access point 305) from the test wireless computing device. The baseline data shown in column 602 may be stored in memory 402.

A third column 603 comprises entries indicating wireless signal strengths associated with a wireless computing device currently located in the first room of the premises 300. For example, the first row of the third column 603 includes a value of −48 dBm that indicates a signal strength, as measured by a wireless computing device in the first room, of a signal from the wireless access point 301 in the dining room. Similarly, the second through eighth rows of the third column 603 respectively include values of −45 dBm, −37 dBm, −43 dBm, −25 dBm, −38 dBm, −41 dBm, and −44 dBm that respectively indicate expected signal strengths, as measured by a wireless computing device in the first room, of signals from the wireless access points 302 (in the child's room), 303 (in the office), 304 (in the master bedroom), 305 (in the first room), 306 (in the bathroom), 307 (in the hall), and 308 (in the second room). This is described in more detail below in connection with FIG. 8.

Figure 6B:

FIG. 6B is a table that shows example signal strengths for a wireless computing device in the second room of the premises 300. Such a table may be stored in memory, e.g., the memory 402. A first column 604 comprises entries corresponding to different wireless access points of the wireless access points 301-308, similar to column 601 of FIG. 6A. A second column 605, indicating the second room signal mapping, comprises entries indicating baseline data associated with a predetermined mapping of measured wireless signal strengths associated with the wireless access points 301-308 in the premises 300. These baseline wireless signal strengths may comprise the expected signal strengths associated with communications with wireless access points (e.g., wireless access points outside of the second room) as measured by a wireless computing device in the second room. The measurements shown in the second column 605 may correspond to expected values of signal strengths based on a predetermined mapping of measured signal strengths, from the wireless access point 308 in the second room and from other wireless access points 301-307 outside the second room, as measured by a test wireless computing device in the second room. For example, the first row of the second column 605 includes a value of −55 dBm that indicates an expected signal strength, as measured by a test wireless computing device in the second room, of a signal from the wireless access point 301 in the dining room. Similarly, the second through eighth rows of the second column 605 respectively include values of −49 dBm, −59 dBm, −75 dBm, −70 dBm, −72 dBm, −77 dbm, and −73 dBm that respectively indicate expected signal strengths, as measured by a test wireless computing device in the second room, of signals from the wireless access points 302 (in the child's room), 303 (in the office), 304 (in the master bedroom), 305 (in the first room), 306 (in the bathroom), 307 (in the hall), and 308 (in the second room). The baseline data shown in column 605 may be received (e.g., by the server 400 and/or via the wireless access point 308) from the test wireless computing device. The baseline data shown in column 605 may be stored in memory 402.

A third column 606 comprises entries indicating wireless signal strengths associated with a wireless computing device currently located in the second room of the premises 300. For example, the first row of the third column 606 includes a value of −53 dBm that indicates a signal strength, as measured by a wireless computing device in the second room, of a signal from the wireless access point 301 in the dining room. Similarly, the second through eighth rows of the third column 606 respectively include values of −46 dBm, −57 dBm, −77 dBm, −72 dBm, −69 dBm, −71 dBm, and −70 dBm that respectively indicate expected signal strengths, as measured by a wireless computing device in the second room, of signals from the wireless access points 302 (in the child's room), 303 (in the office), 304 (in the master bedroom), 305 (in the first room), 306 (in the bathroom), 307 (in the hall), and 308 (in the second room). This is described in more detail below in connection with FIG. 8.

The set of signal strength values measured by a wireless computing device (e.g., the values shown in the third column 603 and/or the third column 606) need not exactly match the signal mapping corresponding to a location (e.g., the strength values shown in the second column 602 and/or the second column 605). For example, as described in more detail with respect to FIG. 8, the measured signal strength values of a wireless computing device and the signal mapping may be compared and found to match within a predetermined threshold.

Figure 7:
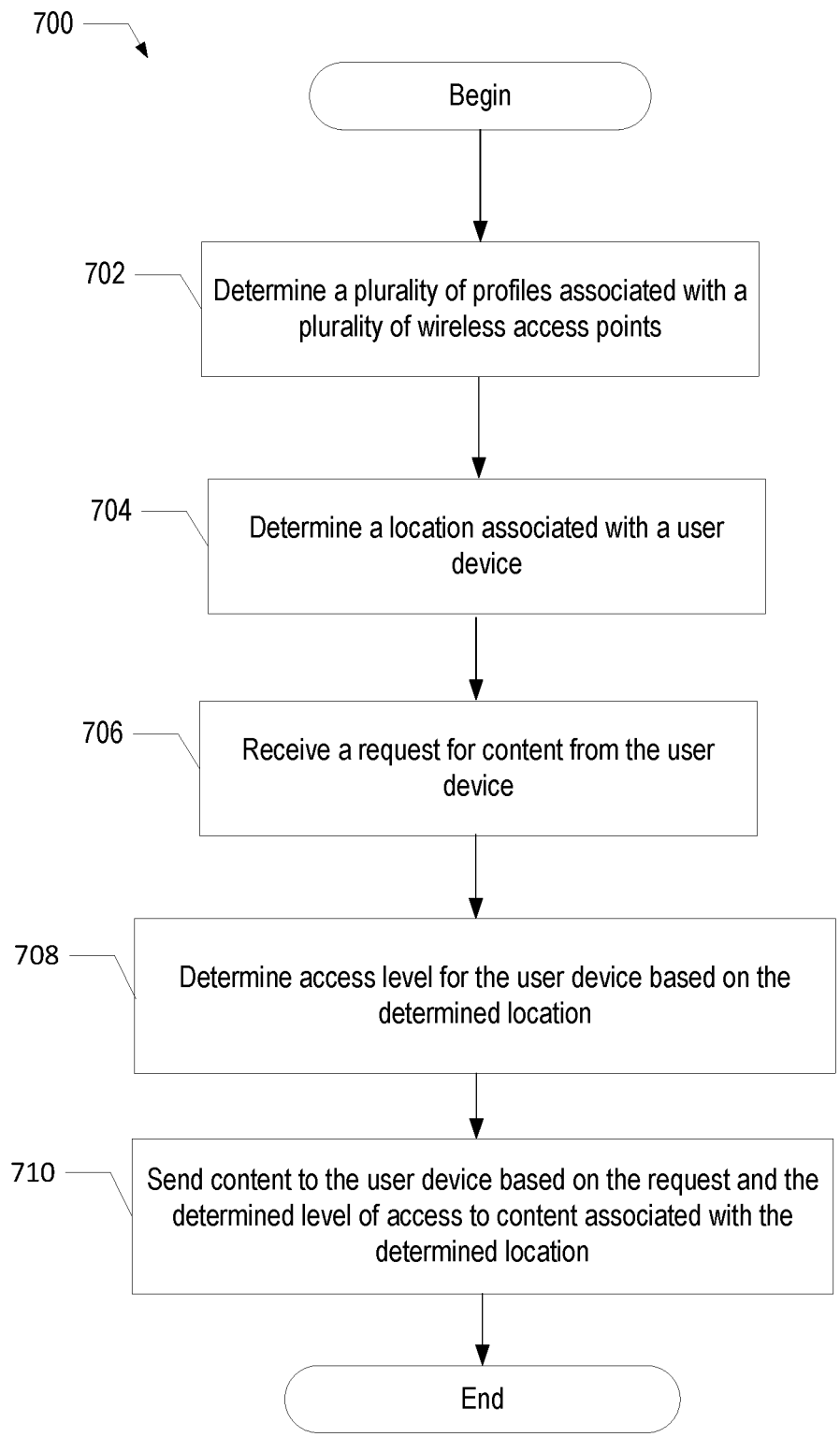
FIG. 7 is a flow chart showing an example method for executing a parental control process.

FIG. 7 shows a flowchart of an example method 700 for controlling access to content. For example, access to content can be controlled based on room location. The flowchart shown in FIG. 7 may be part of or comprise an algorithm which may be performed, e.g., by the server 400 and/or by one or more other computing devices. At step 702, profiles which may be associated with a plurality of wireless access points (e.g., the wireless access points 301-308) may be determined. The determined profiles may correspond to and/or comprise access levels associated with one or more locations. The profiles may each correspond to a room and/or a group of rooms. For example, a user may create a profile for every room in a house, and each profile may be associated with a different access level. The profiles may correspond to one or more wireless access points (e.g., the wireless access points 301-308). The profiles may provide access to particular content for particular wireless computing devices. For example, a profile may specify that one or more first wireless computing devices may access particular content, that one or more second wireless computing devices may have filtered access to the content, that one or more third computing devices might be prohibited from accessing the content, or the like. The profiles may be stored in memory (e.g., in the memory 402 of the server 400).

At step 704, a location of a wireless computing device may be determined. Determining a location of a wireless computing device may comprise comparing received signal strengths, measured by the wireless computing device, with data corresponding to a location mapping (e.g., the location mapping data 408). Step 704 is described in more detail according to the steps shown in FIG. 8.

At step 706, a request for content may be received. The request may be received, via a wireless access point (e.g., the wireless access point 415), from a wireless computing device. Content may comprise, for example, a website, a video, or audio. The wireless computing device may request the content (e.g., from the server 400) by communicating via one or more wireless access points.

At step 708, an access level of the user device based on the determined location of the computing device may be determined. At step 710, based on the determined access level associated with the determined location, content may be sent to the wireless computing device. The communication manager 413 may retrieve the content and send the content, via the communication interface 414, to one or more wireless access points. Additionally or alternatively, the communication manager 413 may instruct one or more other computing devices to send the content (or a portion thereof) to one or more wireless access points. The content may be filtered based on a profile associated with a room. For example, an access level associated with a game room may specify that no violent content may be received by wireless computing devices in the game room such that, when a wireless computing device in the game room requests content, the wireless computing device may receive a portion of the content with violent content portions removed. Some requested content may not be provided and/or may result in a message indicating that the provision of the requested content is not allowed. For example, a message may be sent to a wireless computing device indicating that only a portion of requested content is available. Multiple versions of a particular content may exist (e.g., an adult version and a child's version), and the appropriate version of the content may be determined and sent to the requesting wireless computing device. For example, prior to sending content to a wireless computing device, all or portions of requested content may be removed, censored, and/or replaced with different data.

Figure 8:
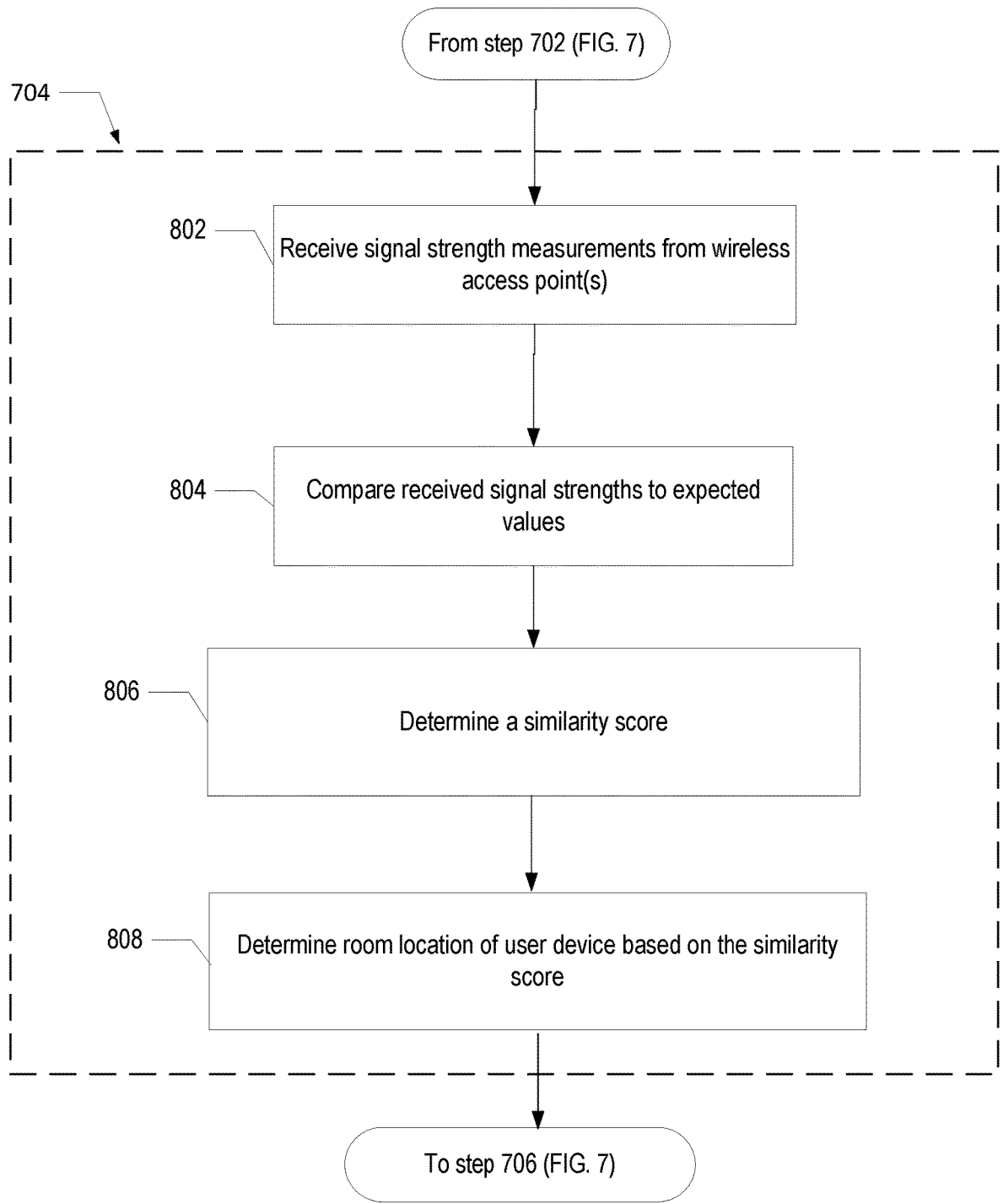
FIG. 8 is a flow chart showing an example method for determining a room location of a user device.

FIG. 8 shows a flowchart of an example method for determining a location of a wireless computing device. The method of FIG. 8 may be part of or comprise an algorithm that may be performed by one or more computing devices. The method of FIG. 8, which may be performed by performed by the server 400 and/or by one or more other computing devices, may be performed as at least part of step 704 of the method 700 (FIG. 7).

At step 802, signal strength measurements corresponding to one or more wireless access points may be received, e.g., from a wireless computing device. A request for the signal strength measurements may be transmitted to the wireless computing device, which may cause the wireless computing device to measure the signal strength of one or more wireless access points and transmit the signal strength(s) (e.g., to the server 400). For example, a plurality of signal strength measurements associated with one or more of the wireless access points 301-308 may be received from a wireless computing device connected to the one or more of the wireless access points 301-308. The wireless computing device may determine such signal strength measurements using, e.g., a modem in the wireless computing device. For example, data received in step 802 may be sets of measurement values such as, e.g., column 603 in FIG. 6A or column 606 in FIG. 6B.

At step 804, the received signal strengths may be compared to expected signal strength values associated with one or more locations (e.g., one or more rooms). For example, the received signal strengths may be compared to baseline data such that shown in column 602 (FIG. 6A), to baseline data such as that shown in column 605 (FIG. 6B), and to baseline for other rooms (e.g., the dining room, the child's room, the office, the master bedroom, the hall, and the bathroom of the premises 300). The baseline data associated with a location may consist of previous wireless access point signal strength measurements taken with respect to a location (e.g., in the location, around the location). For example, a user might walk around a room in the premises 300 with a wireless computing device, take signal strength measurements throughout the room, and transmit those measurements as baseline data (e.g., to the server 400). As another example, historical data (e.g., corresponding to signal strength measurements of one or more wireless computing devices over a time period) may be determined and used to generate the baseline data. Multiple baseline measurements may be taken in a location, at different places about the location, and at different times. Multiple baseline measurements in the same location may be combined to form an average and/or range. The server 400 may receive baseline measurements that were taken at a plurality of distinct points in different locations. The baseline measurements may be stored as the location mapping data 408.

In step 806, a similarity store may be determined. Based on a comparison between the received signal strength measurements and the baseline signal strength data for multiple locations, a closest fit for baseline signal strength values corresponding to different locations may be determined (e.g., by the server 400 or another device). For example, at step 806, there may be multiple data sets of baseline signal strength values (e.g., as shown in columns 602 and 605 of FIGS. 6A and 6B, respectively). Each of those sets of baseline signal strength values may be associated with the same or similar wireless access point(s) and/or with a specific location of the same or similar wireless access point(s). Each of those data sets may be compared with a data set of signal strength values received in step 802. For each comparison, a similarity score may be determined. For example, the similarity score may be calculated based on a sum of the magnitude of the differences between the data set corresponding to the baseline signal strength values and the data set corresponding to signal strength values received in step 802.

A similarity score may be determined mathematically. For example, a similarity score may be computed by computing a numerical difference between baseline signal strength values and signal strength values measured by a wireless computing device. For example, in FIG. 6A, the difference between data in the first row of columns 602 and 603 is (−48)−(−50)=2. The difference between data in the second row of columns 602 and 603 is (−45)−(−43)=−2. The difference between data in the third row of columns 602 and 603 is (−37)−(−34)=−3. The difference between data in the fourth row of columns 602 and 603 is (−43)−(−46)=3. The difference between data in the fifth row of columns 602 and 603 is (−25)−(−20)=−5. The difference between data in the sixth row of columns 602 and 603 is (−38)−(−35)=−3. The difference between data in the seventh row of columns 602 and 603 is (−41)−(−46)=5. The difference between data in the eight row of columns 602 and 603 is (−44)−(−40)=−4. A similarity score may be obtained by summing of the magnitudes of the differences obtained for all the rows, which is |2|+|−2|+|−3|+|3|30 |−5|+|−3|+|5|+|−4|=27.

As another example, comparing FIG. 6A and FIG. 6B, the difference between data in the first rows of columns 603 and 605 is (−48)−(−55)=7. The difference between data in the second rows of columns 603 and 605 is (−45)−(−49)=4. The difference between data in the third rows of columns 603 and 605 is (−37)−(−59)=22. The difference between data in the fourth rows of columns 603 and 605 is (−43)−(−75)=32. The difference between data in the fifth rows of columns 603 and 605 is (−25)−(−70)=45. The difference between data in the sixth rows of columns 603 and 605 is (−38)−(−72)=34. The difference between data in the seventh rows of columns 603 and 605 is (−41)−(−77)=36. The difference between data in the eight rows of columns 603 and 605 is (−44)−(−73)=29. The similarity score may be obtained by taking the sum of the magnitude of the differences obtained for all the rows, which is |7|+|4|+|22|+|32|+|45|+|34|+|36|+|29|=209.

A similarity score may be computed for the other rooms of the premises 300 (the wireless access point 301 in the dining room, the wireless access point 302 in the child's room, the wireless access point 303 in the office, the wireless access point 304 in the master bedroom, the wireless access point 306 in the bathroom, the wireless access point 307 in the hall) based on data in column 603 in FIG. 6A and baseline data sets of signal strength values associated with rooms 301-304 and 306-307 as stored in the memory 402. A best similarity score may be obtained by determining a minimum value of the plurality of similarity scores computed for rooms 301-308. For example, the computed similarity score, based on data in columns 602 and 603 of FIG. 6A, of 27 may be the best similarity score for a wireless computing device located in the game room 305.

At step 808, if a determined similarity score value satisfies a threshold, it may be determined as indicating the wireless computing device is in a location corresponding to the set of baseline signal strengths that yielded the best similarity score.

Figure 9:
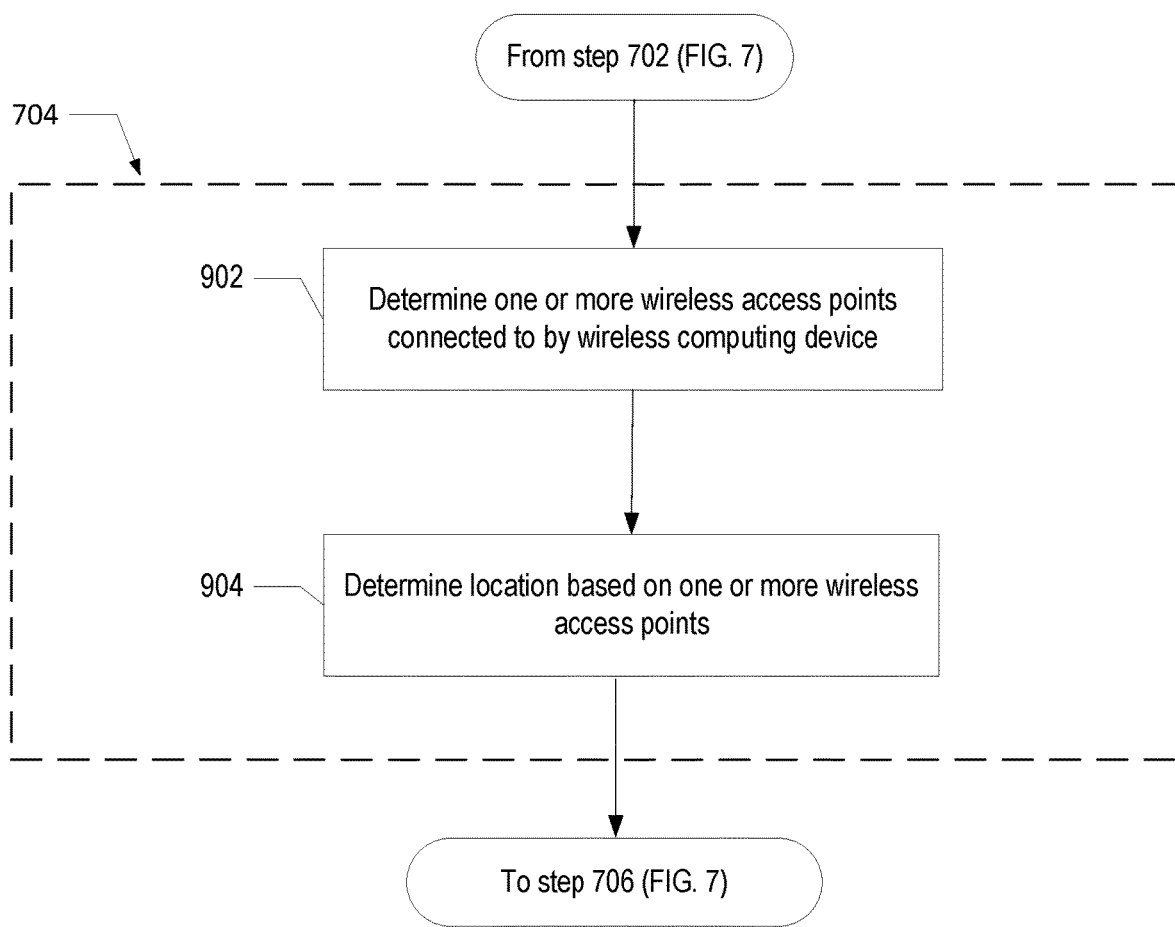
FIG. 9 is a flow chart showing an example method for determining a room location of a user device.

FIG. 9 shows a flowchart of another example method for determining a location of a wireless computing device. The method of FIG. 9 may be part of or comprise an algorithm that may be performed by one or more computing devices. Like FIG. 8, the method of FIG. 9, which may be performed by performed by the server 400 and/or by one or more other computing devices, may be performed as at least part of step 704 of the method 700 (FIG. 7). Alternatively, the steps shown in FIG. 8 may be performed without any of the steps of FIG. 9, and/or the steps of FIG. 9 may be performed without any of the steps in FIG. 8. The flowcharts shown in FIGS. 8 and 9 may occur in series or parallel. For example, the steps shown in FIG. 9 may be performed before those shown in FIG. 8.

In step 902, one or more wireless access points, connected to by a wireless computing device, may be determined. A wireless computing device may be connected to one or more wireless access points. For example, as described above, a wireless access point may be placed in every room of a premises. A wireless computing device may be primarily connected to a wireless access point corresponding to a room that the wireless computing device is in, but may have other connections (e.g., weaker and/or unused) connections to nearby wireless access points, such as wireless access points in neighboring rooms.

In step 904, based on the one or more wireless access points determined in step 902, a location may be determined.

The connection to one or more wireless access points may be used to determine which room a wireless computing device is in. For example, if a wireless computing device is connected to a wireless access point associated with a living room, then the wireless computing device may be in the living room.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A computing device comprising:
one or more processors; and
memory storing instructions that, when executed by the one or more processors, cause the computing device to:
determine, based on communications between a wireless computing device and one or more wireless access points, a location, of the wireless computing device, within a premises;
receive, from the wireless computing device, a request for content;
determine, based on the request and on an access level associated with the location within the premises, whether the wireless computing device is permitted to access the content; and
cause, based on the access level, the content to be sent to the wireless computing device.

2. The computing device of claim 1, wherein the instructions, when executed by the one or more processors, cause the computing device to determine the location by causing the computing device to:
compare signal strengths associated with the communications between the wireless computing device and the one or more wireless access points with a threshold, wherein the threshold is associated with the location.

3. The computing device of claim 1, wherein the instructions, when executed by the one or more processors, cause the computing device to determine whether the wireless computing device is permitted to access the content by causing the computing device to:
determine that the wireless computing device is allowed to access the content at the location.

4. The computing device of claim 1, wherein the instructions, when executed by the one or more processors, cause the computing device to determine the location of the wireless computing device based on signal strengths associated with the communications between the wireless computing device and the one or more wireless access points.

5. The computing device of claim 1, wherein the instructions, when executed by the one or more processors, further cause the computing device to:
determine that the wireless computing device has moved to a second location;
determine a second access level associated with the second location; and
prevent, based on the second access level, the wireless computing device from accessing content.

6. The computing device of claim 1, wherein the instructions, when executed by the one or more processors, further cause the computing device to:
send, based on determining that a second wireless computing device is not allowed to access the content, a message associated with the content.

7. The computing device of claim 1, wherein the instructions, when executed by the one or more processors, further cause the computing device to:
determine that a second wireless computing device is in the location; and
prevent, based on the determination that the second wireless computing device is in the location and further based on the access level, the second wireless computing device from accessing the content.

8. The computing device of claim 1, wherein the instructions, when executed by the one or more processors, cause the computing device to determine the location of the wireless computing device further based on a history of signal strengths associated with the location.

9. A computing device comprising:
one or more processors; and
memory storing instructions that, when executed by the one or more processors, cause the computing device to:
determine expected signal strengths associated with a location within a premises;
receive, from a wireless computing device, a request for content;
determine current signal strengths associated with communications between the wireless computing device and one or more wireless access points;
determine, by comparing the expected signal strengths and the current signal strengths, that the wireless computing device is in the location within the premises; and
cause, based on determining that the wireless computing device is allowed to access content in the location within the premises, the content to be sent to the wireless computing device.

10. The computing device of claim 9, wherein the instructions, when executed by the one or more processors, further cause the computing device to:
determine that the wireless computing device has moved to a second location;
determine an access level associated with the second location; and
prevent, based on the access level, the wireless computing device from accessing the content.

11. The computing device of claim 9, wherein the instructions, when executed by the one or more processors, further cause the computing device to:
determine that a second wireless computing device is in the location; and
prevent, based on the determination that the second wireless computing device is in the location and further based on determining that the second wireless computing device is not allowed to access the content in the location, the second wireless computing device from accessing the content.

12. One or more non-transitory computer-readable media storing instructions that, when executed by one or more processors of a computing device, cause the computing device to perform steps comprising:
determining, based on communications between a wireless computing device and one or more wireless access points, a location, of the wireless computing device, within a premises;
receiving, from the wireless computing device, a request for content;

determining, based on the request and on an access level associated with the location within the premises, whether the wireless computing device is permitted to access the content; and causing, based on the access level, the content to be sent to the wireless computing device.

13. The computer-readable media of claim 12, wherein the instructions, when executed by one or more processors of the computing device, cause the computing device to perform the determining the location by:

comparing signal strengths associated with the communications between the wireless computing device and the one or more wireless access points with a threshold, wherein the threshold is associated with the location.

14. The computer-readable media of claim 12, wherein the instructions, when executed by one or more processors of the computing device, cause the computing device to perform the determining whether the wireless computing device is permitted to access the content by:

determining that the wireless computing device is allowed to access the content at the location.

15. The computer-readable media of claim 12, wherein the instructions, when executed by one or more processors of the computing device, cause the computing device to perform the determining the location of the wireless computing device based on signal strengths associated with the communications between the wireless computing device and the one or more wireless access points.

16. The computer-readable media of claim 12, wherein the instructions, when executed by the one or more processors, further cause the computing device to perform steps comprising:

determining that the wireless computing device has moved to a second location;

determining a second access level associated with the second location; and preventing, based on the second access level, the wireless computing device from accessing content.

17. The computer-readable media of claim 12, wherein the instructions, when executed by the one or more processors, further cause the computing device to perform steps comprising:

sending, based on determining that a second wireless computing device is not allowed to access the content, a message associated with the content.

18. The computer-readable media of claim 12, wherein the instructions, when executed by the one or more processors, further cause the computing device to perform steps comprising:

determining that a second wireless computing device is in the location; and preventing, based on the determination that the second wireless computing device is in the location and further based on the access level, the second wireless computing device from accessing the content.

19. The computer-readable media of claim 12, wherein the instructions, when executed by one or more processors of the computing device, cause the computing device to perform the determining the location of the wireless computing device further based on a history of signal strengths associated with the location.

20. One or more non-transitory computer-readable media storing instructions that, when executed by one or more processors of a computing device, cause the computing device to perform steps comprising:

determining expected signal strengths associated with a location within a premises;

receiving, from a wireless computing device, a request for content;

determining current signal strengths associated with communications between the wireless computing device and one or more wireless access points;

determining, by comparing the expected signal strengths and the current signal strengths, that the wireless computing device is in the location within the premises; and causing, based on determining that the wireless computing device is allowed to access content in the location within the premises, the content to be sent to the wireless computing device.

21. The computer-readable media of claim 20, wherein the instructions, when executed by the one or more processors, further cause the computing device to perform steps comprising:

determining that the wireless computing device has moved to a second location;

determining an access level associated with the second location; and preventing, based on the access level, the wireless computing device from accessing the content.

22. The computer-readable media of claim 20, wherein the instructions, when executed by the one or more processors, further cause the computing device to perform steps comprising:

determining that a second wireless computing device is in the location; and preventing, based on the determination that the second wireless computing device is in the location and further based on determining that the second wireless computing device is not allowed to access the content in the location, the second wireless computing device from accessing the content.

23. A system comprising:

a computing device; and a wireless computing device;

wherein the computing device comprises:

one or more first processors; and first memory storing first instructions that, when executed by the one or more first processors, cause the computing device to:

determine, based on communications between the wireless computing device and one or more wireless access points, a location, of the wireless computing device, within a premises;

receive, from the wireless computing device, a request for content;

determine, based on the request and on an access level associated with the location within the premises, whether the wireless computing device is permitted to access the content; and cause, based on the access level, the content to be sent to the wireless computing device; and wherein the wireless computing device comprises:

one or more second processors; and second memory storing second instructions that, when executed by the one or more second processors, cause the wireless computing device to:

send the request for the content.

24. The system of claim 23, wherein the first instructions, when executed by the one or more first processors, cause the computing device to determine the location by causing the computing device to:

compare signal strengths associated with the communications between the wireless computing device and the one or more wireless access points with a threshold, wherein the threshold is associated with the location.

25. The system of claim 23, wherein the first instructions, when executed by the first one or more processors, cause the computing device to determine whether the wireless computing device is permitted to access the content by causing the computing device to:
   determine that the wireless computing device is allowed to access the content at the location.

26. The system of claim 23, wherein the first instructions, when executed by the one or more first processors, cause the computing device to determine the location of the wireless computing device based on signal strengths associated with the communications between the wireless computing device and the one or more wireless access points.

27. The system of claim 23, wherein the first instructions, when executed by the one or more first processors, further cause the computing device to:
   determine that the wireless computing device has moved to a second location;
   determine a second access level associated with the second location; and
   prevent, based on the second access level, the wireless computing device from accessing content.

28. The system of claim 23, wherein the first instructions, when executed by the one or more first processors, further cause the computing device to:
   send, based on determining that a second wireless computing device is not allowed to access the content, a message associated with the content.

29. The system of claim 23, wherein the first instructions, when executed by the one or more first processors, further cause the computing device to:
   determine that a second wireless computing device is in the location; and
   prevent, based on the determination that the second wireless computing device is in the location and further based on the access level, the second wireless computing device from accessing the content.

30. The system of claim 23, wherein the first instructions, when executed by the one or more first processors, cause the computing device to determine the location of the wireless computing device further based on a history of signal strengths associated with the location.

31. A system comprising:
   a computing device; and
   a wireless computing device;
   wherein the computing device comprises:
      one or more first processors; and
      first memory storing first instructions that, when executed by the one or more first processors, cause the computing device to:
         determine expected signal strengths associated with a location within a premises;
         receive, from the wireless computing device, a request for content;
         determine current signal strengths associated with communications between the wireless computing device and one or more wireless access points;
         determine, by comparing the expected signal strengths and the current signal strengths, that the wireless computing device is in the location within the premises; and
         cause, based on determining that the wireless computing device is allowed to access content in the location within the premises, the content to be sent to the wireless computing device; and
   wherein the wireless computing device comprises:
      one or more second processors; and
      second memory storing second instructions that, when executed by the one or more second processors, cause the wireless computing device to:
      send the request for the content.

32. The system of claim 31, wherein the first instructions, when executed by the one or more first processors, further cause the computing device to:
   determine that the wireless computing device has moved to a second location;
   determine an access level associated with the second location; and
   prevent, based on the access level, the wireless computing device from accessing the content.

33. The system of claim 31, wherein the first instructions, when executed by the one or more first processors, further cause the computing device to:
   determine that a second wireless computing device is in the location; and
   prevent, based on the determination that the second wireless computing device is in the location and further based on determining that the second wireless computing device is not allowed to access the content in the location, the second wireless computing device from accessing the content.

* * * * *